(12) United States Patent
Benuzzi

(10) Patent No.: US 7,832,978 B2
(45) Date of Patent: Nov. 16, 2010

(54) APPARATUS FOR FORMING STACKS OF PANELS AND FEEDING THEM TO A USER STATION

(75) Inventor: Piergiorgio Benuzzi, Bologna (IT)

(73) Assignee: Giben International S.p.A., Pianoro (IT)

( * ) Notice: Subject to any disclaimer, the term of this patent is extended or adjusted under 35 U.S.C. 154(b) by 343 days.

(21) Appl. No.: 11/996,533

(22) PCT Filed: Mar. 29, 2007

(86) PCT No.: PCT/IB2007/000961
§ 371 (c)(1),
(2), (4) Date: Jan. 23, 2008

(87) PCT Pub. No.: WO2007/113673
PCT Pub. Date: Nov. 10, 2007

(65) Prior Publication Data
US 2008/0267757 A1     Oct. 30, 2008

(30) Foreign Application Priority Data
Apr. 4, 2006    (IT)   ......................... BO2006A0238

(51) Int. Cl.
     *B65G 59/00*     (2006.01)
     *B65H 3/24*     (2006.01)
     *B65H 1/08*     (2006.01)
(52) U.S. Cl. ..................... 414/796; 271/42; 271/128; 414/796.9
(58) Field of Classification Search ................ 225/103; 271/42; 414/751.1, 796, 796.2, 796.3, 796.5, 414/796.6, 796.8, 796.9, 798.2, 798.3, 798.6, 414/798.7
See application file for complete search history.

(56) References Cited

U.S. PATENT DOCUMENTS 3,190,642 A    *   6/1965    Smith ........................... 271/42
4,055,258 A    *   10/1977   Schneider ................... 414/796

(Continued)

FOREIGN PATENT DOCUMENTS

DE        3619676 A1   *   12/1987

(Continued)

*Primary Examiner*—Gregory W Adams
(74) *Attorney, Agent, or Firm*—Pearne & Gordon LLP

(57) ABSTRACT

An apparatus for forming stacks (2) of panels (3) from a vertical pile (4) of panels (3) to be fed to a user station comprises: a crossbar (5) that moves above the pile (4) of panels (3) and mounts selector means (6; 7, 8) designed to separate a certain number of panels (3) from the top of the pile (4); first gripper means (9; 10) and second gripper means (11; 12, 16) for clamping the panels (3); the selector means (6; 7, 8) include a first wedge-shaped selection element (8) that can be inserted between the panels (3) in the pile (4) to create a gap; the apparatus (1) also comprises second selector means (16) mounted on the crossbar (5) and mobile in a feed direction (40) and relative to the crossbar (5), lengthways along the crossbar (5) itself in a first horizontal direction (13), in such a way that they can be inserted into the pile (4) next to the first wedge-shaped element (8) at the gap so as to completely separate the pile (4) at a point away from the first wedge-shaped element (8) by sliding in the first horizontal direction (13).

21 Claims, 5 Drawing Sheets

U.S. PATENT DOCUMENTS

| | | | | |
|---|---|---|---|---|
| 4,620,827 A | * | 11/1986 | Sameshima et al. | 414/796 |
| 4,955,854 A | * | 9/1990 | Roth | 225/103 |
| 5,017,085 A | * | 5/1991 | Ishikawa | 414/796 |
| 5,102,293 A | * | 4/1992 | Schneider | 414/796 |
| 5,368,678 A | * | 11/1994 | Miyamoto et al. | 156/405.1 |
| 5,657,618 A | * | 8/1997 | Dall'Omo et al. | 53/504 |

FOREIGN PATENT DOCUMENTS

| | | | |
|---|---|---|---|
| DE | 199 55 878 A1 | | 5/2001 |
| EP | 1264792 A1 | * | 12/2002 |
| EP | 1 484 270 A2 | | 12/2004 |
| EP | 1 505 017 A1 | | 2/2005 |
| JP | 09323837 A | * | 12/1997 |

\* cited by examiner

APPARATUS FOR FORMING STACKS OF PANELS AND FEEDING THEM TO A USER STATION

TECHNICAL FIELD

This invention relates to an apparatus for forming and moving stacks of panels, such as, for example, veneering or sheets of wood or like material, including composites, and in particular, panels whose thickness is relatively small compared to the surface area.

BACKGROUND ART

Current panel sawing processes by which large panels are cut into smaller sub-panels used, for example, in the furniture industry, involve the use of apparatus which, starting from a vertical pile of panels or sheets positioned on an elevator table: select a certain number of panels from the top of the pile; grip the selected panels to form a stack; and transfer the stacks thus formed at regular intervals to a sawing station.

In an apparatus of this kind made by the same Applicant as this invention, panel selection is achieved by the combined operation of a stop element that references the top of the pile and a panel selection element. Both these elements are mounted on a crossbar that moves to and from above the pile of panels in a direction parallel to itself between a position in which it receives the pile of panels and a position in which it feeds the panels to the sawing station.

The selection element operates in a development plane below the reference stop at the top of the pile at a distance corresponding to the thickness of the required stack of panels.

A side wall abuts against one side of the pile at the face opposite the face of it nearest the selection element. Opposing the reaction exerted by the side wall and in some cases also acting in conjunction with the simultaneous lowering of the elevator table, the selection element is actuated in such a way as to create a gap in the pile of panels separating a certain number of stacked panels en bloc from the rest of the panels in the pile below that will form the subsequent stacks.

The crossbar also mounts gripper clamps having parallel, horizontal jaws. The lower jaw of each of the clamps penetrates the gap created and kept open by the selection element and, working in conjunction with the upper jaw that acts on the panel at the top, clamps the stack of panels separated en bloc from the rest of the pile. The crossbar is then moved horizontally with the jaws in the clamped position in such a way as to carry the stack of panels thus selected towards the sawing station.

In the apparatus described above, the clamps are fixed to the crossbar and other than the limited forward movement of the jaws required to enable them to grip the edge of the stack, and the movements required for positional adjustment, the clamps are in practice unable to move relative to the crossbar.

The apparatus has proved highly satisfactory when working with relatively thick panels, that is to say, panels whose flexural rigidity is sufficiently high to prevent them from sagging and enabling them to remain in a substantially flat, straight condition.

However, when the panels to be selected and moved are thin, that is to say, when the surface area of the panels is very large compared to their thickness, the apparatus described above has some significant disadvantages.

Thus, once the selection element has selected the panels required to form a stack and lifted them off the rest of the pile, the parts of the panels at the sides of the selection element may bend under their own weight on account of their flexibility, making it difficult for the clamps to grip them securely or, in some cases, causing the two clamps to grip a different number of panels.

When the crossbar starts moving, the panel (or panels) gripped on one side only tends to move out of alignment with respect to the rest of the stack, causing moving parts to jam. When this happens, the machine has to be brought to an immediate stop and the panels or, even worse, the machine itself, may be seriously damaged.

The flexibility of the panels may also lead to a problem of another kind, due to the fact that one or two panels at the top of the pile below the gap created by the selection element may be accidentally dragged along with the selected stack.

Thus, if the panels are very flexible, the parts of the selected stack furthest away from the clamps touch the panel at the top of the pile below and, when the crossbar starts moving towards the sawing station, the bottom of the selected stack scrapes against the top of the pile, with the risk of dragging the top panels along with it.

If the stack contains a large number of panels, that is to say, if it is very heavy, the weight of the stack bears down on the rest of the panels in the pile below and the resulting friction between the bottom of the stack being moved and the panel at the top of the remaining pile may be strong enough to move the top panel or panels out of alignment relative to the rest of the pile.

In this case, too, the machine has to be stopped, the damaged panels removed and normal operation resumed, with all the obvious disadvantages that this involves, especially when the machine forms part of a more complex production line.

DISCLOSURE OF THE INVENTION

The aim of this invention, therefore, is to overcome the above mentioned disadvantages by providing an apparatus capable of guaranteeing regular operation irrespective of panel rigidity, that is to say, even when working with highly flexible panels and/or panels that are grouped together in stacks containing large numbers of them.

The apparatus according to this aim is defined by the contents of the appended claims, especially claim 1, as well as any of the claims that depend, either directly or indirectly, on claim 1.

BRIEF DESCRIPTION OF THE DRAWINGS

The advantages of the solution proposed by this invention are apparent from the detailed description which follows, with reference to the accompanying drawings which illustrate a preferred embodiment of the invention provided merely by way of example without restricting the scope of the inventive concept, and in which.

DETAILED DESCRIPTION OF THE PREFERRED EMBODIMENTS OF THE INVENTION

Figure 1:
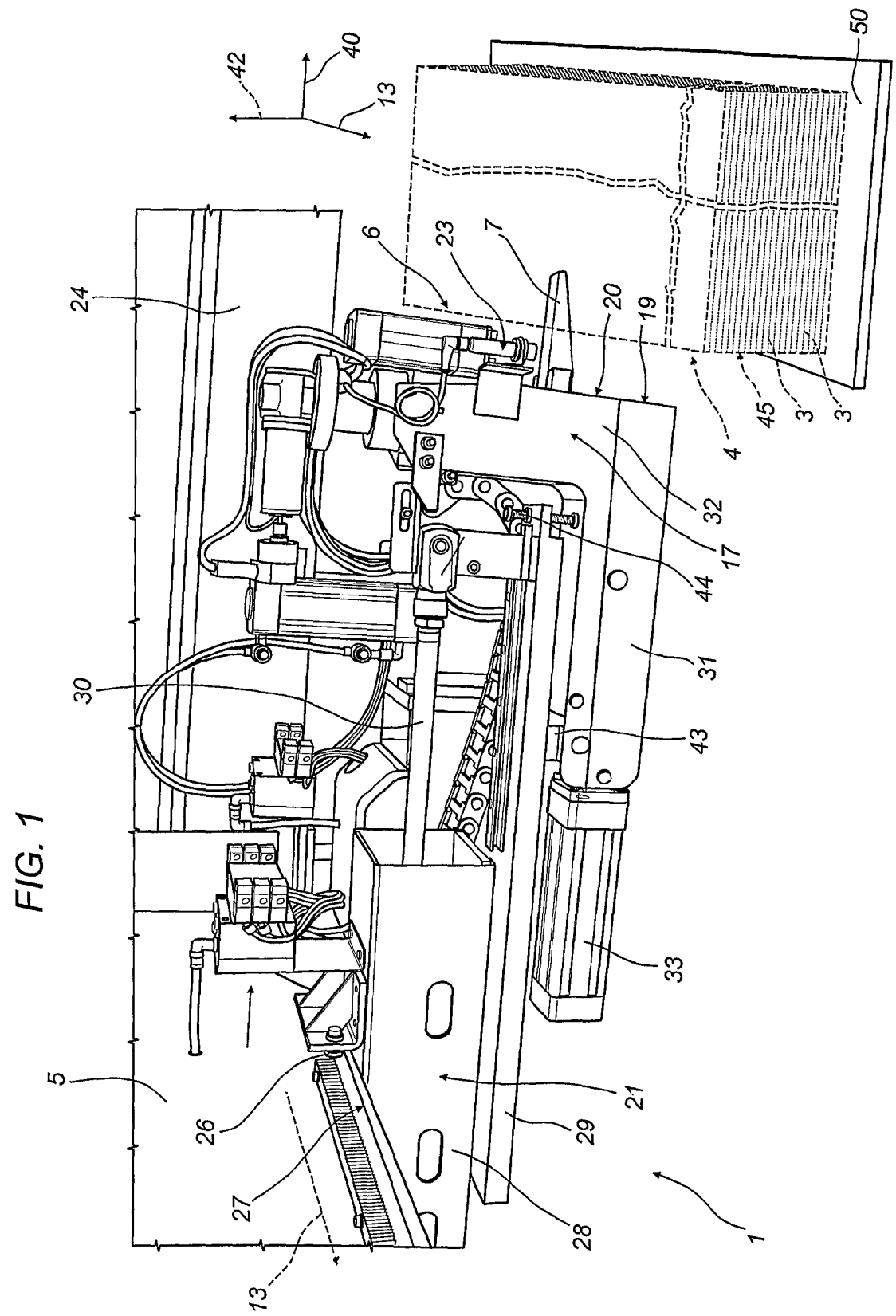
FIG. 1 is a perspective assembly view, with some parts cut away in order to better illustrate others, showing the apparatus according to the invention, for forming and moving stacks of panels, in a first operating step.
Figure 5:
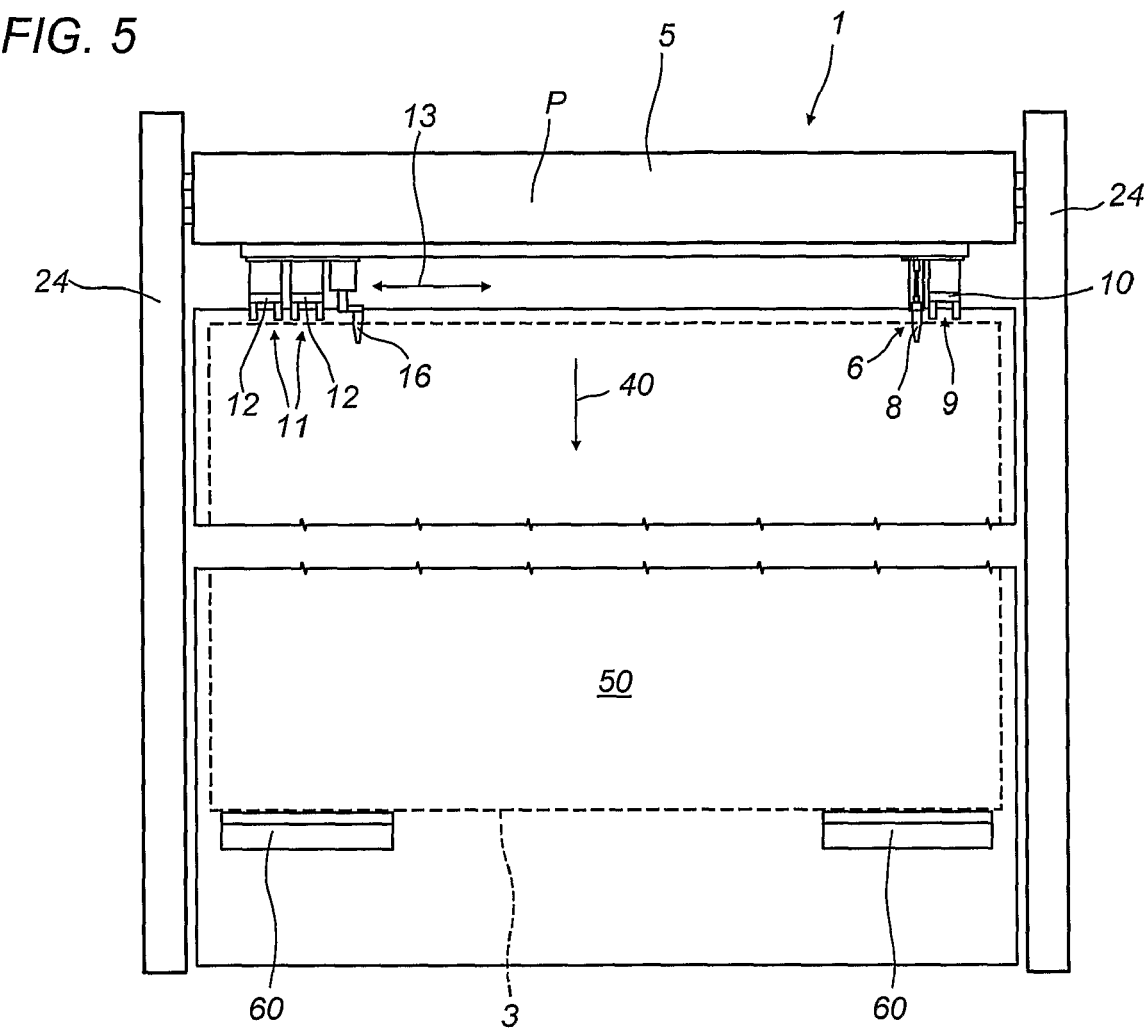
FIG. 5 shows the apparatus of the previous figures, illustrated in a plan view and in a position where a stack of panels has been selected and is ready to be transferred to other machines for processing.

With reference to FIGS. 1 and 5, the numeral 1 denotes in its entirety an apparatus for forming stacks 2 of panels 3 from a vertical pile 4 of panels 3 and feeding the stacks 2 to a user station.

The term panels 3 is used generically to indicate panels in the strict sense such as, for example, solid panels made of wood of various kinds and in various thicknesses but also to layered veneering of composite materials such as sheets of plywood and/or like materials used for example in the furniture industry or in shipbuilding.

However they are made, the panels 3 are preferably thin but very large in surface area. They are therefore highly flexible and elastically deformable even under their own weight only.

The user station is not shown in the drawings since it is irrelevant to this invention.

It might, for example, be a conventional sawing station in which the large panels 3 are cut into smaller panels according to specific application needs.

As shown in FIGS. 1 and 5, the apparatus 1 comprises a horizontal crossbar 5, supported at one end by a pair of parallel longitudinal members 24 and actuated by respective drive means (not illustrated). The longitudinal members 24 are parallel to a horizontal feed direction 40 along which, as explained in more detail below, the panels 3 are fed towards the user station.

The crossbar 5 is mobile in a direction parallel to itself, above the pile 4 of panels 3, to and from at least—in this embodiment—between two limits corresponding to: a position where it receives the pile 4 of panels 3, above an elevator table 50 (illustrated in FIG. 5) and a position where it places the stack 2 in the user station.

The movement of the crossbar 5 refers only to the selection position since the crossbar 5 may continue into the user station to move the selected stack 2 while it is processed.

The apparatus 1 comprises selector means, labelled 6 as a whole, designed to form on the top of the pile 4 supported by the elevator table 50 stacks 2 of panels 3 to be transferred to the user station.

The selector means 6 are mounted on the crossbar 5 and, more specifically, comprise a reference stop 7 for the top of the pile 4 and a first wedge-shaped rod-like element 8 driven transversally to the pile 4 in the feed direction 40 in such a way as to separate from the pile 4 a certain number of panels 3 at the top to form the stack 2.

The apparatus 1 also comprises first and means, labelled respectively 9 and 11 as a whole, for gripping the panels 3.

Figure 2:
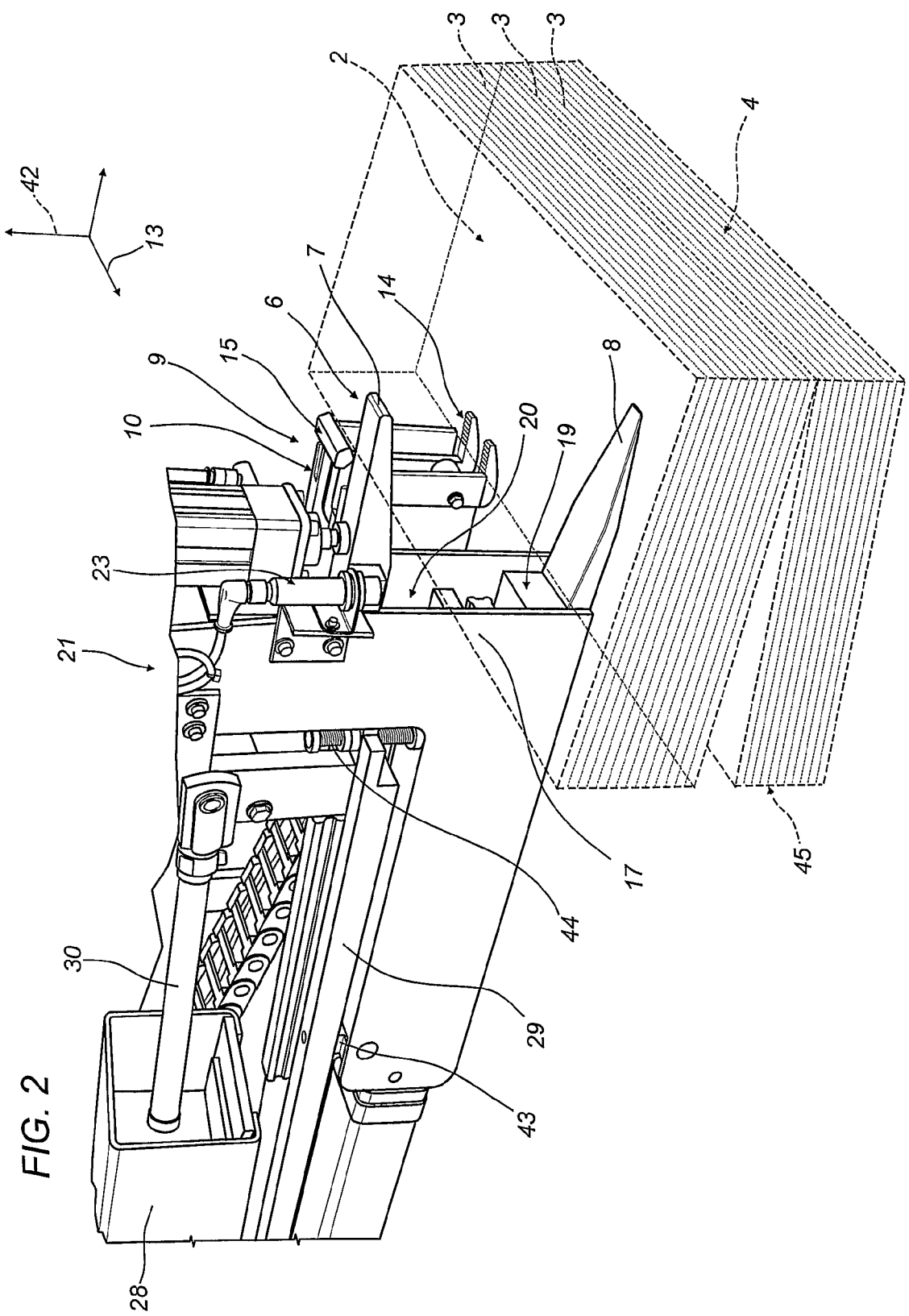
FIG. 2 is a perspective view of the apparatus of FIG. 1 in a second operating step.

As may be inferred from FIGS. 1 and 2 together, the first means 9 for gripping the panels 3 comprise a first clamp 10 mounted on the crossbar 5 in a substantially fixed position close to one of the longitudinal members 24. Looking at FIGS. 1 and 3, on the other hand, it may be noticed that the second gripper means 11 may comprise, by way of non-limiting example, a pair of second clamps 12, which are parallel with each other, positioned side by side, integrated by a second wedge-shaped element 16 and mobile along the crossbar 5.

As shown in particular in FIG. 2: the unit formed by the first clamp 10, the first wedge-shaped element 8 and the reference stop 7 for the top of the pile 4 may be mounted, together with a shoulder 17, on a first carriage 21, which is in turn mounted on the crossbar 5 in such a way as to be fixed at the end point of the crossbar 5 itself.

Alternatively, this unit might run on wheels 26 and rails 27, shown in FIG. 1, along the crossbar 5 in a first horizontal direction, labelled 13.

The carriage 21 includes a tubular beam 28, oriented transversally to the crossbar 5, below which there is a rod 29 that runs horizontally in a guide on the tubular beam 28 and driven by a suitably controlled actuator, only an end rod 30 of which is illustrated. The shoulder 17 is rigidly fixed to the rod 29 and can therefore move as one with the rod 29 towards and away from the crossbar 5, that is to say, towards and away from a facing side 45 of the pile 4.

The shoulder 17 is formed by two solid arms 31 and 32 at right angles to each other. The lower, substantially horizontal arm 31 has a guide 19 inside it to enable the first wedge-shaped element 8 to be driven horizontally with respect to the shoulder 17 by an actuator 33 behind it, also mounted on the shoulder 17. The second arm 32, substantially vertical, mounts the top reference stop 7, which projects horizontally from it. The reference stop is engaged in a guide 20 of the second arm 32 enabling its position relative to the arm 32 itself to be adjusted by means of a kinematic adjustment system and an encoder (both being of customary type and therefore not illustrated), the encoder making it possible to detect the vertical distance between the top reference stop 7 itself and the first wedge-shaped element 8 underneath, guided by the horizontal arm 32.

The numeral 23 denotes an optical unit for detecting the presence of the side 45 of the panels 3 as the shoulder 17 moves closer to the panels 3.

In fact, comparing FIGS. 1 and 2 shows that the shoulder 17 is first made to advance towards the pile 4 in such a way that its second arm 32 is near the side 45 of the pile 4, this being detected by the unit 23. After lifting the pile 4 in such a way that the top panel 3 comes into contact with the top reference stop 7, the first wedge-shaped element 8, which has in the meantime moved all the way into the first arm 31, is made to come out of the latter with a rapid, snap movement. As a result, the wedge-shaped element 8 is forcibly inserted into the pile 4 in such a way as to separate a suitably high stack 2 of panels 3 above it, from the panels 3 below it and still forming part of the pile 4 which remains underneath the first wedge-shaped element 8.

It should be noticed that the forcible insertion of the first wedge-shaped element 8 into the pile 4 does not damage the panels 3 since, during subsequent processes, the panel edges will first be trimmed and then machined in various ways.

In any case, to minimize damage if necessary, the first wedge-shaped element 8 and the shoulder 17 that houses it in the apparatus 1 according to the invention are mounted on the crossbar 5 in such a way that they can be adjusted by swinging in a vertical plane containing the directions 42 and 40. For this purpose, the shoulder 17 is linked to the rod 29 in such a way that it can rotate about a pin 43 and can be locked in a fixed relative position using an adjustment screw 44: this enables the first wedge-shaped element 8 to be adjusted in such a way that it can penetrate between the panels 3 in the pile 4 in a condition of optimal tangency to the plane in which the panels 3 lie.

It should nevertheless be stressed that the separating action of the first wedge-shaped element 8 is followed by a coordinated downward movement of the elevator table 50 (in the vertical direction 42) so as to create a gap around the first wedge-shaped element 8. This possibility of coordinated movement also makes it easier for all the panels 3 in the stack 2 to be uniformly selected.

The numeral 60 in FIG. 5 denotes further reference stops located in the proximity of the side of the pile 4 of panels 3 opposite the panel 3 selection side (that is to say, the side nearest the user station).

These reference stops 60, usually one or more blocks, act on the outer edge of the selectable panels 3 at the top of the pile 4 when the first wedge-shaped element 8 is inserted into the pile 4.

This is possible by adjusting the reference blocks 60 in height to stop the panels 3, preferably against one of their vertical sides, in order to prevent unwanted movement of the panels 3 penetrated by the first wedge-shaped element 8.

Figure 3:
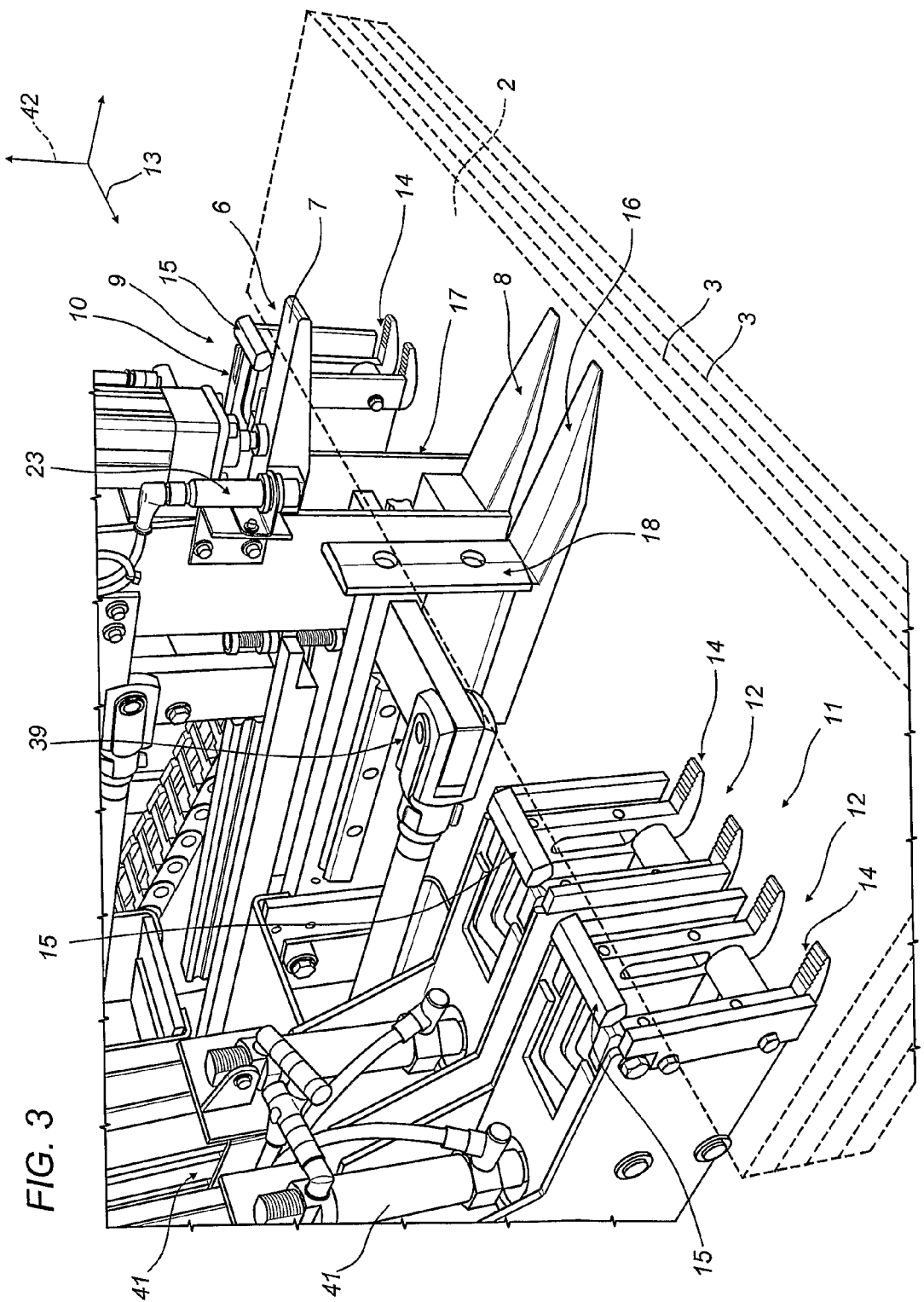
FIG. 3 is a perspective view of the apparatus of FIG. 1, but also showing other working parts of it, in a third operating step.
Figure 4:
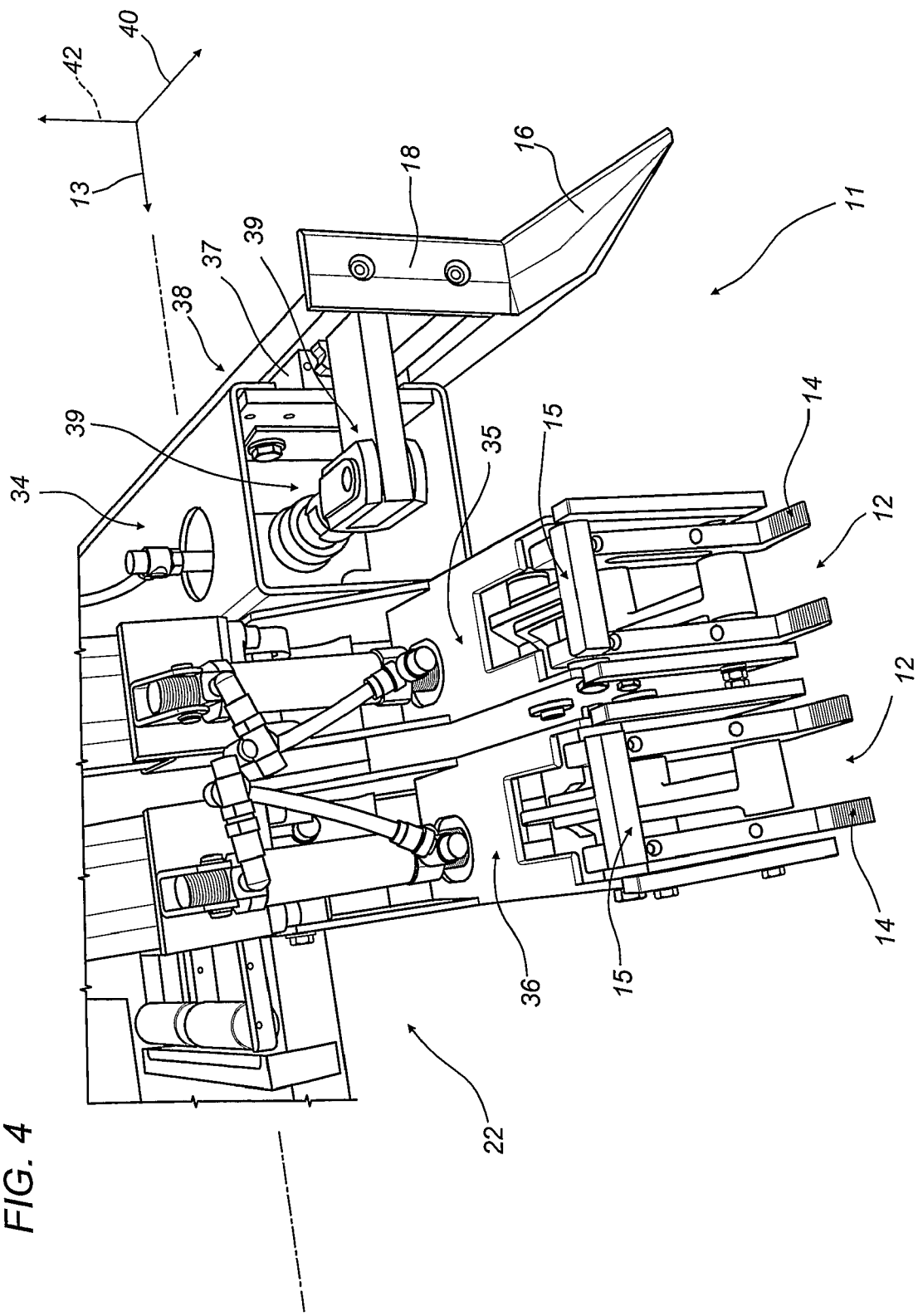
FIG. 4 is a perspective view of the apparatus as shown in FIG. 3 but with the parts shown in FIG. 1 cut away.

The apparatus 1 further comprises at least one second carriage 22—shown as a whole in FIG. 4—also mounted next to the carriage 21—see FIG. 3—on the crossbar 5 and able to move both ways along the crossbar 5 itself in the first horizontal direction 13.

The second carriage 22 mounts the following components as one: the second wedge-shaped element 16, a shoulder 18 of the second wedge-shaped element 16 and of the second gripper means 11 comprising (again by way of example), a pair of second clamps 12, which are positioned side by side, parallel with each other and at the side of the second wedge-shaped element 16.

More specifically, the second carriage 22 comprises three parallel tubular beams 34, 35 and 36 oriented transversally to the crossbar 5 and located underneath the latter. One side of the first beam 34 forms guide 37 that supports a frame-like structure 38 that mounts the second wedge-shaped element 16 and the related shoulder 18 which are fixed to, and integral with, each other. An actuator, only some end parts of which 39 being shown in FIGS. 3 and 4, housed in the beam 34 enables the second wedge-shaped element 16, when driven, to run along the mounting beam 34 in such a way as to move towards and away from the crossbar 5 in the horizontal feed direction 40 at right angles to the crossbar 5.

The second beam 35 and the third beam 36, on the other hand, each mount a second clamp 12 and the actuating means 41 for opening and closing the clamp jaws 15 and 16 which are horizontal and substantially parallel with each other.

Owing to the structure of the constraints of the second wedge-shaped element 16, of the second clamps 12 and of the second carriage 22, the second wedge-shaped element 16 has two fundamental possibilities of movement.

Thus, a first degree of freedom means that it can move horizontally and transversally to the crossbar 5 in such a way that it can be inserted into the pile 4, next to the first wedge-shaped element 8 and inside the gap or separating space defined by it and delimited by the stack 2 of panels 3 above and the remainder of the pile 4 below.

A second degree of freedom, on the other hand, means that the second wedge-shaped element 16 can move, together with the second clamps 12, lengthways along the crossbar 5, that is to say, in the first horizontal direction 13, owing to the fact that the entire second carriage 22 is able to move.

As to the possibility of movement connected with the above mentioned first degree of freedom, it should also be noticed that, unlike the first wedge-shaped element 8, the second wedge-shaped element 16 cannot move relative to the reference shoulder 18 since the shoulder 18 and the second element 16 are attached to each other and, when driven to do so, forced to move as one.

The apparatus 1 will now be described in terms of the basic steps in its operation (see FIG. 1). When the pile 4 has been lifted in the vertical direction 42 by the elevator table 50 and its side 45 abuts against the reference shoulder 17, the top panel 3 comes into contact with the reference stop 7, generating a control signal that causes the first wedge-shaped element 8 to move out of its guide 19 and to be inserted between two panels 3 of the pile 4 (see FIG. 2) thus separating a stack 2 whose panels 3 are positioned between the first wedge-shaped element 8 and the top reference stop 7.

Once the first wedge-shaped element 8 has effected this selection, the elevator table 50 is lowered in such a way as to create the gap around the first wedge-shaped element 8.

At this point the second wedge-shaped element 16 is (if necessary) placed beside the first wedge-shaped element 8 and advanced from a retracted position—shown in FIG. 4—until it is next to the first element 8, as shown in FIG. 3 and in such a way that the two shoulders 17 and 18 are positioned near the side 45 of the panels 3.

Next, the second carriage 22 is driven along the crossbar 5 in the horizontal direction 13, away from the first carriage 21. It should be noticed that there are no obstacles to hinder this movement since the second wedge-shaped element 16 moves within the separating space or gap created and kept open by the first wedge-shaped element 8.

Figure 6:
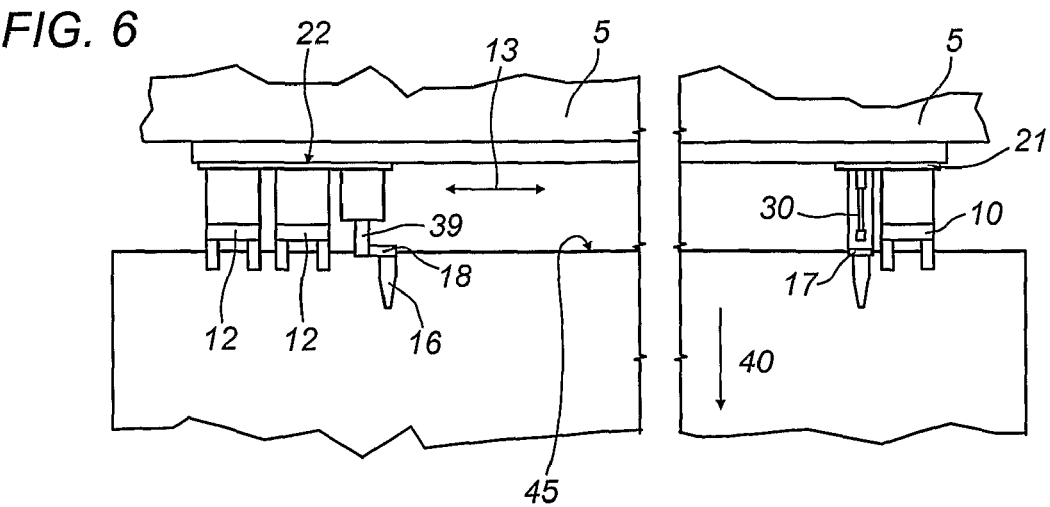
FIG. 6 shows a detail P from FIG. 5.

It should also be noticed that the clamps 10 and 12 are in a retracted position relative to the two wedge-shaped elements 8 and 16, that is to say, they are inactive, as clearly shown also in FIGS. 5 and 6.

As a result of this movement, the stack 2 of panels 3 is supported at two points, namely on the first wedge-shaped element 8 and on the second wedge-shaped element 16, which, if necessary, can move away from the first, thus achieving optimum flatness, even if the panels 3 being handled are thin and very flexible. This flatness makes it possible to securely move the panels 3 in exactly the same number as the panels 3 selected at a predetermined distance (preferably in the vicinity of the opposite edge of the panels 3, as illustrated again in FIGS. 5 and 6).

Once the second wedge-shaped element 16 has reached the predetermined position, the crossbar 5 is moved in the horizontal direction 40 towards the user station in such a way that the two shoulders 17 and 18 push the stack 2 of panels 3 towards the user station.

At the user station, the two wedge-shaped elements 8 and 16 are retracted while the clamps 10 and 12 grip the stack 2 to be processed.

An apparatus constructed as described above therefore fully achieves the aforementioned aims thanks to the presence of a second wedge-shaped element that moves along the crossbar to balance the panels while they are being selected so that they can be gripped securely.

This is accomplished without excessively altering the structure of the crossbar and the operating cycle of the crossbar and mobile clamps.

The invention described has evident industrial applications and can be modified an adapted in many ways without thereby departing from the scope of the inventive concept. Moreover, all the details of the invention may be substituted by technically equivalent elements.

The invention claimed is:

1. An apparatus for forming a stack (2) of panels (3) from a vertical pile (4) of panels (3) and feeding said stack (2) to a user station, said apparatus (1) comprising:
   a crossbar (5) mobile in a feed direction (40), above the pile (4) of panels (3), to and fro at least between two limits corresponding to a position where the stack (2) is formed and a position where the stack (2) is placed in the user station;
   first selector means (6; 7, 8) mounted on the crossbar (5) and comprising a reference stop (7) for the top of the pile (4) and a first wedge-shaped element (8) drivable transversally into the pile (4) in the feed direction (40) in such a way as to separate from the pile (4) the stack (2) at the top, and creating a gap around the first wedge-shaped element (8) by moving the pile (4) relative to the first wedge-shaped element (8) in a vertical direction (42);

first gripper means (9; 10) comprising a first clamp (10) mounted on the crossbar (5), said first clamp (10) comprising an upper clamp element (15) and a lower clamp element (14) effective to clamp the stack (2) between said upper (15) and lower (14) clamp elements;

second gripper means (11; 12) comprising a second clamp (12) mounted on the crossbar (5), said second clamp (12) comprising an upper clamp element (15) and a lower clamp element (14), the second clamp (12) being effective to clamp the stack (2) between said upper (15) and lower (14) clamp elements;

the apparatus (1) being characterised in that it further comprises:

second selector means (16) mounted on the crossbar (5) and mobile in the feed direction (40) in such a way that said second selector means (16) can be inserted into the pile (4) next to the first wedge-shaped element (8) at the gap, said second selector means (16) also being slidable in a horizontal direction (13) substantially perpendicular to said feed direction (40) in such a way that the second selector means (16) can be slid to a point further away from the first wedge-shaped element (8) to further separate the stack (2) from the pile (4), said second selector means (16) being distinct from the upper clamp element (15) and the lower clamp element (14) of the first clamp (10) and from the upper claim element (15) and the lower clamp element (14) of the second clamp (12);

wherein the first selector means, second selector means, first gripper means and second gripper means are each independently movable relative to the other.

2. The apparatus according to claim 1, characterised in that the second selector means comprises a second wedge-shaped element (16) associated with the second gripper means (11; 12) mobile in the horizontal direction (13) in such a way that it can be inserted into the pile (4) next to the first wedge-shaped element (8) at the gap so as to completely separate the pile (4) at a point away from the first wedge-shaped element (8) by sliding together with the second gripper means (11, 12).

3. The apparatus according to claim 2, characterised in that the first wedge-shaped element (8) and the second wedge-shaped element (16) are equipped with respective shoulders (17, 18) for referencing a side (45) of the pile (4) and constituting elements for pushing the selected stack (2).

4. The apparatus according to claim 3, characterised in that the first wedge-shaped element (8) is mobile relative to its shoulder (17) in such a way as to protrude from the shoulder (17) after the latter has come to a stop against the pile (4) of panels (3) or has stopped pushing the pile (4).

5. The apparatus according to claim 4, characterised in that the second wedge-shaped element (16) and the respective shoulder (18) for referencing the pile (4) are fixed to, and integral with, each other.

6. The apparatus according to claim 5, characterised in that the second wedge-shaped element (16) and the respective shoulder (18) are mobile as one.

7. The apparatus according to claim 4, characterised in that the first wedge-shaped element (8) is drivable in such a way as to move in a rapid snap-like fashion relative to its referencing shoulder (17).

8. The apparatus according to claim 1, where the pile (4) rests on a vertically mobile horizontal elevator table (50), characterised in that the elevator table (50) that supports the pile (4) is mobile at least downwardly in synchrony with a command that drives the first wedge-shaped element (8) so as to move the part of the pile (4) below it away after the first wedge-shaped element (8) itself has been inserted into the pile (4) and thereby creating the gap in the latter.

9. The apparatus according to claim 1, characterised in that at least the first wedge-shaped element (8) is mounted on the crossbar (5) in such a way that it can be adjusted by swinging in a vertical plane.

10. The apparatus according to claim 1, characterised in that the second gripper means (11; 12) comprise a pair of said second clamps (12), positioned side by side and parallel with each other.

11. The apparatus according to claim 1, characterised in that the a first referencing shoulder (17) of the first wedge-shaped element (8) comprises respective guides (19, 20) for supporting the first wedge-shaped element (8) and the reference stop (7) for the top of the pile (4), the referencing shoulder (17) being in turn mounted on a first carriage (21) that can move along the crossbar (5).

12. The apparatus according to claim 11, wherein the second selector means comprises a second wedge-shaped element (16), and wherein the second gripper means (11; 12) and the second wedge-shaped element (16) are mounted as one on a second carriage (22) that can move along the crossbar (5), and wherein the first carriage (21) and the second carriage (22) are driven along the crossbar (5) independently of each other.

13. The apparatus according to claim 11, wherein the second selector means comprises a second wedge-shaped element (16), and wherein the second gripper means (11; 12) and the second wedge-shaped element (16) are mounted as one on a second carriage (22) that can move along the crossbar (5), and wherein the first carriage (21) and the second carriage (22) mounted on the crossbar (5) moving towards the user station are designed to transfer the stack (2) of panels (3) to the user station by the pushing action of referencing shoulders (17, 18) in such a way that the stack (2) moves over the free panels (3) remaining in the pile (4).

14. The apparatus according to claim 1, wherein the second selector means comprises a second wedge-shaped element (16), and wherein the second gripper means (11; 12) and the second wedge-shaped element (16) are mounted as one on a second carriage (22) that can move along the crossbar (5).

15. The apparatus according to claim 1, characterised in that the reference stop (7) for the top of the pile (4) is adjustably mounted for height and is controlled by an optical unit (23) for detecting the presence of the panels (3).

16. The apparatus according to claim 1, characterised in that, in the vicinity of the a side of the pile (4) of panels (3) opposite the selection side, the apparatus comprises reference stops (60) acting at least on an outer edge of the selectable panels (3) at the top of the pile (4) at least when the first wedge-shaped element (8) is inserted into the pile (4).

17. The apparatus according to claim 1, wherein the second selector means comprises a second wedge-shaped element (16).

18. The apparatus according to claim 1, wherein the second selector means is movable in the feed direction (40) and in the horizontal direction (13) but not in a vertical direction toward an opposing clamp element to provide a clamping action.

19. A method for selecting a stack (2) of panels (3) from a vertical pile (4) of panels (3) using an apparatus (1) comprising at least:

a crossbar (5) mobile in a feed direction (40), above the pile (4) of panels (3), to and fro at least between two limits corresponding to a position where the stack (2) is formed and a position where the stack (2) is placed in a user station;

first selector means (6; 7, 8) mounted on the crossbar (5) and comprising a reference stop (7) for the top of the pile (4) and a first wedge-shaped element (8) drivable transversally into the pile (4) in the feed direction (40), the method being characterised in that it comprises the following steps:

inserting the first wedge-shaped element (8) into the pile (4) of panels (3) in the feed direction (40) in such a way as to separate from the pile (4) the stack (2) at the top;

creating a gap around the first wedge-shaped element (8) by moving the pile (4) relative to the first wedge-shaped element (8) in a vertical direction (42);

inserting second selector means (16) mounted on the crossbar (5) and mobile in the feed direction (40) in such a way as to penetrate the pile (4) next to the first wedge-shaped element (8) at the gap;

moving the second selector means (16) away from the first wedge-shaped element (8) in a horizontal direction (13) substantially perpendicular to said feed direction (40) in such a way to move the second selector means (16) to a point further away from the first wedge-shaped element (8) to further separate the stack (2) from the pile (4), said second selector means (16) being distinct from the upper clamp element (15) and the lower clamp element (14) of the first clamp (10) and from the upper claim element (15) and the lower clamp element (14) of the second clamp (12);

wherein the first selector means, second selector means, first gripper means and second gripper means are each independently movable relative to the other.

20. The method of claim 19, wherein the second selector means comprises a second wedge-shaped element (16).

21. The method of claim 19, wherein the second selector means is movable in the feed direction (40) and in the horizontal direction (13) but not in a vertical direction toward an opposing clamp element to provide a clamping action.

* * * * *